United States Patent [19]

Bobba

[11] Patent Number: 5,235,168

[45] Date of Patent: Aug. 10, 1993

[54] BAR CODE SCANNER HOUSING ASSEMBLY

[75] Inventor: Mohan L. Bobba, Eugene, Oreg.

[73] Assignee: Spectra-Physics Scanning Systems, Inc., Eugene, Oreg.

[21] Appl. No.: 720,266

[22] Filed: Jun. 24, 1991

[51] Int. Cl.⁵ .............................................. G06K 7/10
[52] U.S. Cl. ..................................... 235/462; 235/467
[58] Field of Search .................. 235/462, 467; 350/319

[56] References Cited

U.S. PATENT DOCUMENTS 4,700,656 10/1987 Cone et al. .
4,794,240 12/1988 Schorr et al. .
4,955,693  6/1989 Bobba .................................. 235/467

Primary Examiner—Harold Pitts
Attorney, Agent, or Firm—Killworth, Gottman, Hagan & Schaeff

[57] ABSTRACT

A bar code scanner housing assembly for enclosing the components of a bar code scanner is provided. The bar code scanner housing assembly comprises a cartridge including an upper window which is removably mounted therein and a housing including a recess for receiving the cartridge, a lower window mounted within the recess and means for generating bar code scan lines. The cartridge is removably mounted within the recess such that the surface of the cartridge is substantially flush with the upper surface of the housing. The housing assembly may include a mask molded into the recess so as to minimize the amount of ambient light passing into the housing. The housing assembly may also comprise a groove surrounding the lower window which has a removable gasket disposed therein for sealing the space between the upper window and lower window. The housing assembly may comprise a window cartridge which eliminates the need for a separate upper window disposed within the cartridge of a bar code scanner housing assembly.

25 Claims, 3 Drawing Sheets

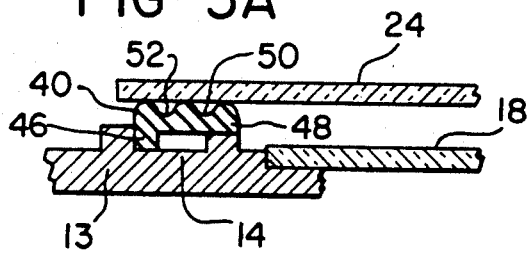
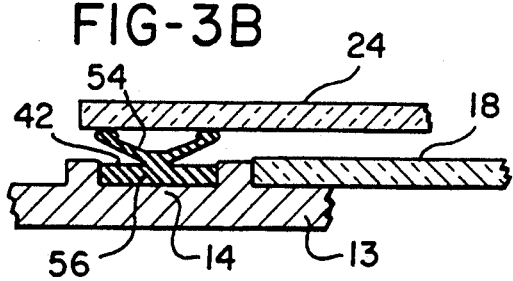
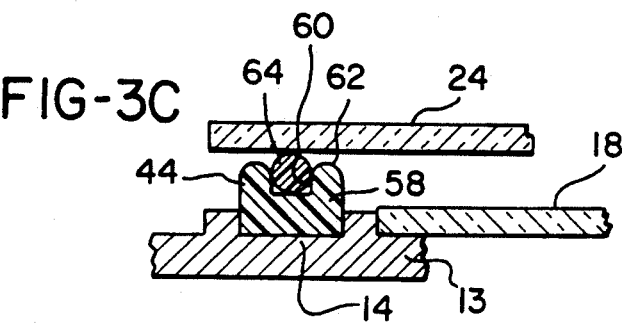
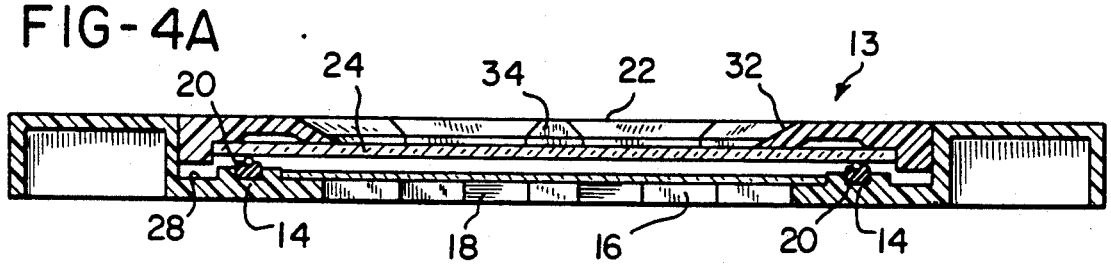
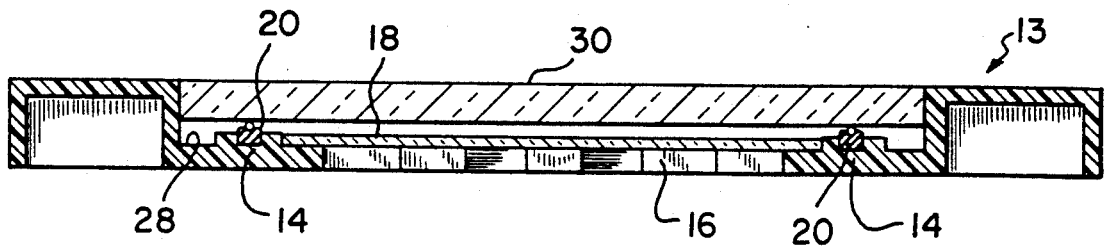

BAR CODE SCANNER HOUSING ASSEMBLY

BACKGROUND OF THE INVENTION

The present invention relates generally to bar code scanners and more particularly, to a bar code scanner housing assembly which seals the bar code scanner from spilled liquids and other contaminants to which such scanners may be exposed in normal use in a point of sale environment such as a supermarket. The present invention also relates to a bar code scanner housing assembly which permits convenient replacement of components exposed to such spilled liquids and contaminants.

Supermarket checkout counters commonly include optical scanners mounted therein for optically scanning bar code labels on products to be purchased as the products are moved over scanning windows comprising at least a portion of the top surfaces of such scanners. These optical scanners, referred to herein as bar code scanners, typically include a housing or enclosure which contains a source of laser light, scanning optics for directing a scanning beam to sweep across a surface to be scanned in one or more scan lines, a lower sealed window through which the scanning beam and returning light may be transmitted, and a cartridge or cassette having another window, referred to as the upper window. The cartridge is removable and field replaceable upon being scratched or broken.

In order for the bar code scanner to operate in an optimal fashion, both the upper and lower windows must be optically transparent and free of scratches, smears, discolorations and other contaminants which would prevent the scanning beam and returning light from passing unimpeded through the windows. The upper window mounted in the cartridge is the most susceptible to such damage since it is subjected to abrasion caused by products as they move across the supermarket checkout counter. Accordingly, it has been necessary to replace the upper window more often than desired. Since prior art bar code scanner assemblies have included an upper window that is permanently affixed within a cartridge, the entire cartridge has typically been replaced in order to replace the upper window, thus increasing the expense of maintaining such a bar code scanner. Therefore, it would be desirable to have a bar code scanner having a housing assembly which permits the window to be replaced without replacing an entire cartridge.

The upper surfaces of window cartridges used in prior art bar code scanners are typically not entirely flush or smooth as a result of having the upper window mounted within the cartridge. Ridges and/or indentations are formed around the upper window at the surface of the window cartridge. Consequently, a product to be scanned must be lifted, tilted or twisted so as to slide the product across the surface of the upper window through which the scanning beam is transmitted to read a bar code label. The upper window is subjected to abrasion caused by such twisting, tilting and/or lifting of the products in addition to the abrasion caused by sliding the products over the window surface. Moreover, the throughput time for the products is increased which is undesirable. Of more concern are the significant number of checkout clerks that develop "carpal tunnel" syndrome from the systematic and continuous twisting, turning and lifting of products over the ridges and indentations found on the window cartridge surface of prior art bar code scanners. Accordingly, it is desirable to have a housing assembly for a bar code scanner which includes a cartridge having a surface that is substantially flush or smooth.

Typical bar code scanner housing assemblies include a space or gap between the lower window and the upper window which must be tightly sealed so as to preclude liquids and dust from seeping through to the lower window. When such contaminants seep through the window cartridge, the lower window must be cleaned. This is frequently difficult and time consuming, and decreases bar code scanner availability. After a significant amount of contaminants seep onto the lower window, it must be replaced. Replacement of the lower window significantly adds to the maintenance costs for a bar code scanner. Moreover, the lower window is not easily replaced since it is not contained, for example, in a removable cartridge. Rather, the lower window is typically permanently mounted in the housing. Previous bar code scanners have not included housing assemblies which seal the space defined between the upper window and the lower window. The effective sealing of this space is necessary to prevent contaminants from seeping onto the lower window. The size of the space between the windows varies significantly since the windows may have a multitude of sizes and shapes. It would therefore be desirable to have a bar code scanner housing assembly which seals the space between the upper and lower windows such that contaminants are precluded from seeping through to the lower window.

A common feature found in most bar code scanners is a mask on the upper window which minimizes the amount of ambient light passing through the window into the housing. Most environments in which bar code scanners operate are highly lighted. This has the potential of subjecting the optical components enclosed in the housing to a significant amount of ambient light. If too great an amount of ambient light were permitted to enter the housing, the signal-to-noise ratio would be reduced, preventing the bar code scanner from operating in an optimal fashion. The mask limiting the level of ambient light is typically formed from a polymeric material and disposed on the upper window in a variety of patterns. A common technique is to form the mask directly on the upper window via a silk screening technique. However, the silk screening technique is relatively expensive. Additionally, the mask must be replaced as often as the upper window since it is permanently formed on the upper window. Thus, it is desirable to have a bar code scanner which includes a mask for minimizing the amount of ambient light absorbed by the bar code scanner which requires replacement less frequently and is less expensive than those used in the past.

Accordingly, there is a need for a bar code scanner housing assembly which permits the convenient and less expensive replacement of worn components and which prevents spilled liquids and other contaminants from seeping onto the lower window of the housing assembly. There is also a need for a bar code scanner housing assembly which reduces wear of the upper components of the housing assembly and which reduces the amount of ambient light collected by the optical components of the housing assembly.

SUMMARY OF THE INVENTION

The present invention meets the aforementioned needs by providing a bar code scanner housing assembly which includes a removable upper window that may be replaced without replacing the entire cartridge. The bar code scanner housing assembly comprises a cartridge including an upper window, also referred to herein as a first window, which is removably mounted within the cartridge. The housing assembly further includes a housing having a recess for receiving the cartridge, a lower window, also referred to herein as a second window, and a means for generating a scanning beam including appropriate optical components. The cartridge is removably mounted within the recess such that the surface of the cartridge is substantially flush with the upper surface of the housing. The housing may comprise an upper enclosure, also referred to herein as a first enclosure, and a lower enclosure, also referred to herein as a second enclosure.

The invention also provides a bar code housing assembly including a window cartridge having an upper surface that is substantially flush or smooth which thereby decreases product throughput time and reduces abrasion. Accordingly, the bar code scanner housing assembly comprises a window cartridge and a housing including a recess for receiving the window cartridge and means for generating a scanning beam. The window cartridge is removably mounted within the recess such that the surface of the window cartridge is substantially flush with the upper surface of the housing. By incorporating a window cartridge having a smooth surface, the ridges or indentations formed as a result of mounting the upper window within a cartridge are eliminated. Thus, the products to be scanned do not have to be tilted, twisted or turned as they move across the bar code scanner.

The aforementioned needs are met by the invention which provides a bar code scanner housing assembly including an upper window and a lower window that are tightly sealed with a gasket. The gasket prevents spilled liquids and other contaminants from seeping through the cartridge down onto the lower window of the housing assembly. The bar code scanner housing assembly comprises a cartridge having an upper window removably mounted therein and a housing including a recess for receiving the cartridge, a lower window mounted within the recess, a groove surrounding the upper window having the gasket disposed therein. The cartridge is removably mounted within the recess such that the surface of the cartridge is substantially flush with the upper surface of the housing. The gasket is compressed between the upper and lower windows, thus providing an effective seal to preclude spilled liquids and other contaminants from seeping onto the lower window.

The present invention provides a bar code housing assembly which includes a mask for minimizing the amount of ambient light that passes through the upper scan window into the housing. The bar code scanner housing assembly comprises a cartridge having an upper window removably mounted therein and a housing including a recess for receiving the cartridge, a mask molded into the recess of the housing, a lower window disposed onto the mask in the recess. The mask may have any desired pattern such that it reduces the amount of ambient light absorbed through the upper and lower windows into the means for generating bar code scan lines contained in the housing. The housing may comprise a lower enclosure and an upper enclosure in which the mask is molded.

Accordingly, it is an object of the present invention to provide a bar code scanner housing assembly which includes components that may be replaced conveniently and less expensively; to provide a bar code scanner housing assembly which reduces the abrasion experienced by the surface of the housing assembly and increases throughput of products; to provide a bar code housing assembly which prevents spilled liquids and contaminants from seeping onto the lower window of the housing assembly; and, to provide a convenient and less expensive means for minimizing the amount of ambient light passing into the housing of a bar code scanner housing assembly. Other objects and advantages of the invention will be apparent from the following description, the accompanying drawings and the appended claims.

BRIEF DESCRIPTION OF THE DRAWINGS

FIGS. 2A-2B are perspective views of embodiments 10' and 10", respectively, wherein FIG. 2A shows the housing assembly 10' having a removable upper window mounted in the cartridge while FIG. 2B shows the housing assembly 10" having a window cartridge;

FIGS. 3A-3C are enlarged schematic views of the region around the gasket of the housing assembly 10 wherein three gasket configurations are shown in FIG. 3A, FIG. 3B and FIG. 3C respectively; and FIGS. 4A-4B are schematic views of housing assemblies 10' and 10", respectively, wherein FIG. 4A is taken along the line 4A—4A in FIG. 2A, and FIG. 4B is taken along the line 4B—4B in FIG. 2B.

DETAILED DESCRIPTION OF THE PREFERRED EMBODIMENT

Figure 1:
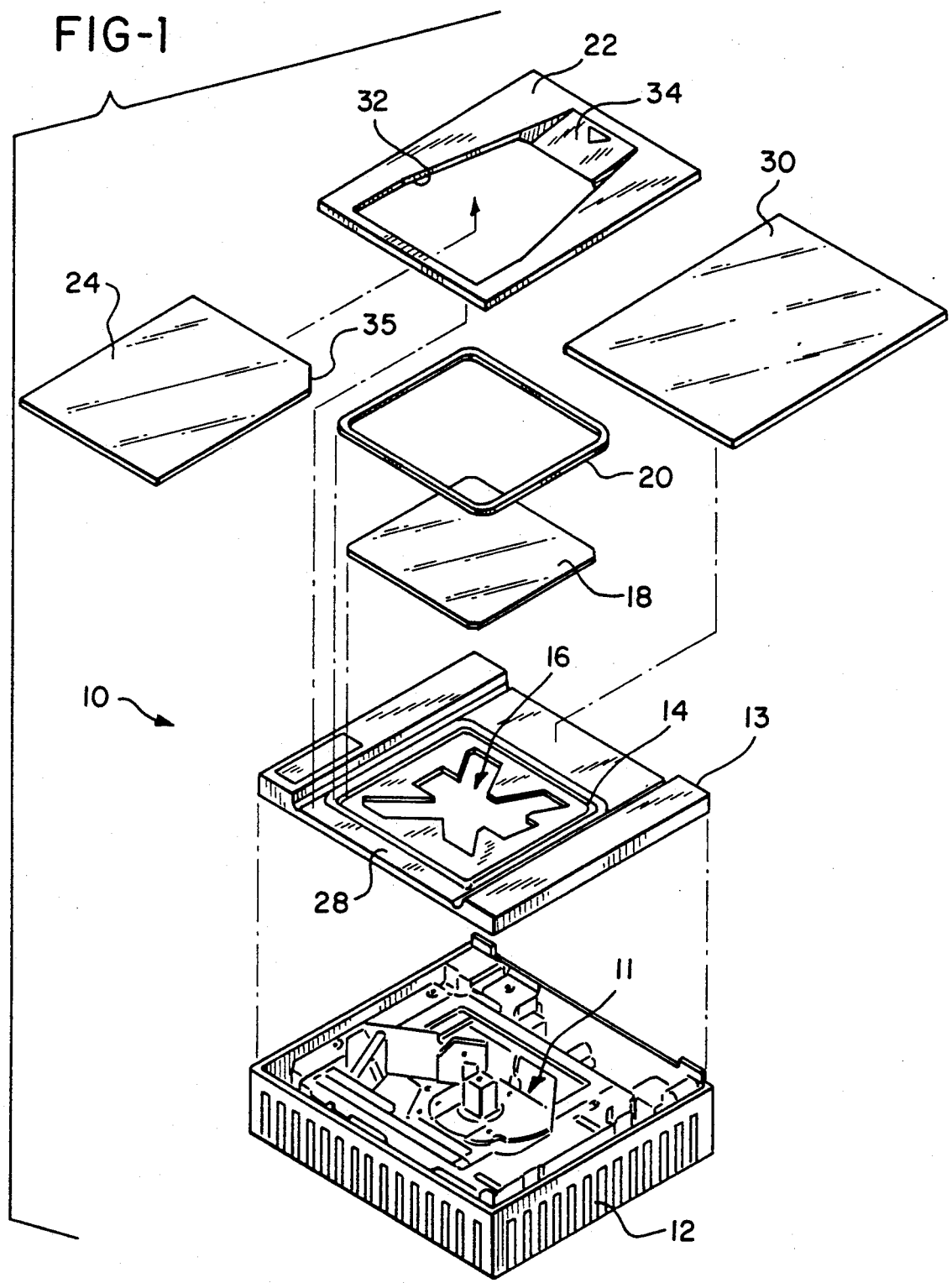
FIG. 1 is an exploded view of the bar code scanner housing assembly 10 in accordance with the invention.

FIG. 1 is an exploded view of a bar code scanner housing assembly 10 in accordance with the present invention. A lower enclosure 12 forms the base of the housing assembly 10 and encloses a means 11 for a scanning beam comprising optical components necessary for generating scan lines for scanning and reading bar code labels on a package or product. An upper enclosure 13 is disposed onto the lower enclosure 12. The combination of the lower enclosure 12 and the upper enclosure 13 is also referred to herein as the housing. The lower enclosure 12 may be secured to the upper enclosure 13 by any means known in the art including but not limited to clips and snap fasteners. These details are not illustrated or described herein as they do not form part of the invention. The upper enclosure 13 may include a groove 14 formed around a mask 16 which is molded into the surface of a recess 28 of the upper enclosure 13. The groove 14 is generally rectangular in shape such that it may receive a lower window 18, also referred to herein as a first window, through which bar code scan lines may be transmitted. The lower window 18 is superposed over the mask 16 of the upper enclosure 13. A gasket 20 is interposed between the groove 14 and an upper window 24. The gasket 20 is disposed into the groove 14 yet remains removable such that when the lower window 18 must be cleaned or replaced, the gasket 20 may also be removed and cleaned or replaced.

Figure 2A:
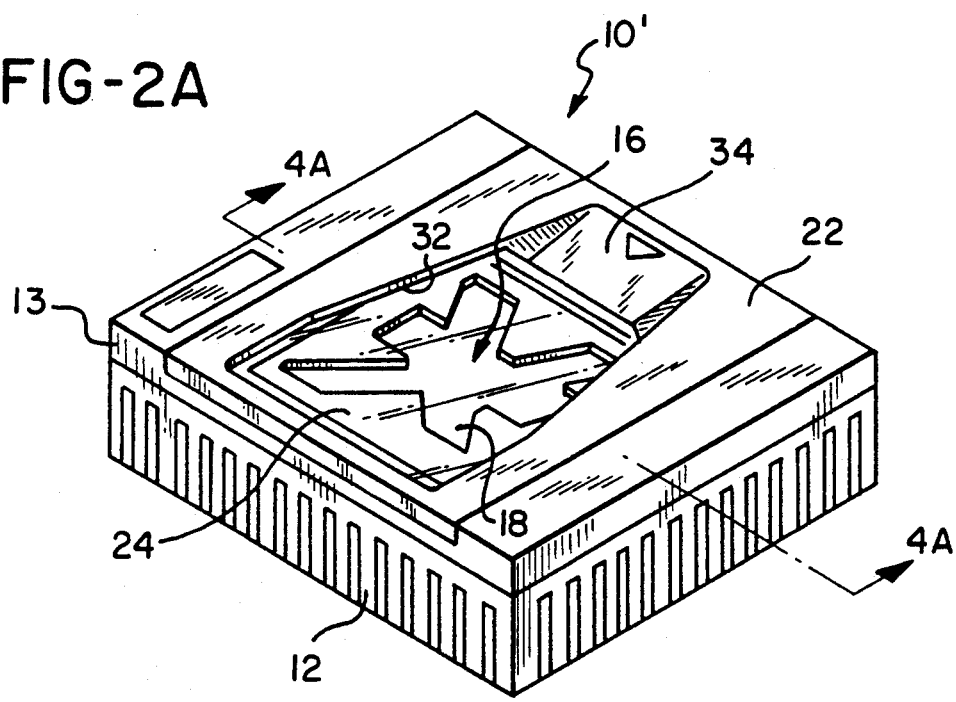

In one embodiment of the present invention, a cartridge 22 forms the upper portion of the housing assembly 10'. Referring now to FIG. 1 and FIG. 2A, the cartridge 22 includes the upper window 24 removably mounted therein through which a scanning beam may be transmitted. The upper window 24 may include an angled corner 35 which may be used to ensure proper orientation of the upper window 24 as it is mounted in the cartridge 22. More specifically, the back side of the cartridge 22 (not shown) may include a means for alignment, such as a pin or wall positioned at a corner of the cartridge 22, such that only the angled corner 35 of the upper window 24 can fit therein. The upper window 24 may be secured in the cartridge 22 by any means including but not limited to a rotatable cam positioned on the back of the cartridge 22. The surface of the cartridge 22 includes a ridge 32 and an indentation 34 to provide a relatively smooth degradation to the surface of the upper window 24. The ridge 32 and the indentation 34 are necessary features of the cartridge 22 for mounting the upper window 24 as smooth as possible with the surface of the cartridge 22. It should be understood that the ridge 32 and the indentation 34 may be varied in size and configuration from those depicted in FIG. 1. The means for securing the upper window 24 within the cartridge 22 does not form part of the present invention and is not illustrated in FIGS. 1 and 2A nor described herein in detail. Any known means may be used to secure the upper window 24 within the cartridge 22.

The cartridge 22 is molded from a polymeric material. The polymeric material may comprise any of numerous polymers or combinations of polymers which are known and may be molded in accordance with the invention. The upper window 24 and the lower window 18 are made from materials selected from the group consisting of borosilicate glass, soda-lime silicate (float) glass, glass ceramic, quartz, near quartz, BK 7 glass and combinations thereof. The upper window 24 may include a protective coating over its upper surface so as to increase the life of the upper window 24. The protective coating on the upper window 24 may include a first layer of material through which a scanning beam may be transmitted. The first layer may be deposited onto the upper window 24, and is preferably formed of materials selected from the group consisting of aluminum oxide, aluminum nitride, zirconium oxide, yttrium oxide, diamond film, diamond-like carbon, silicon nitride, boron nitride and combinations thereof. Additionally, the protective layer may include a second layer of material deposited onto the first layer, the second layer being formed of materials selected from the group consisting of diamond-like carbon, diamond film, polytetrafluoroethylene, polyethylene, tin oxide, indium oxide, silicone polymers, boron nitride, aluminum oxide and combinations thereof.

In a point of sale environment such as a supermarket, the housing assembly 10 typically will be mounted into a checkout counter having only the upper surface of the housing assembly 10 exposed to the environment. Thus, the surface of the cartridge 22 and the upper window 24 will be exposed to abrasion caused by supermarket products as the checkout clerk slides the products across the checkout counter. When the upper window 24 accumulates numerous scratches, smears, discolorations and/or other contaminants which prevent the bar code scan lines from passing unimpeded, the upper window 24 requires replacement. In accordance with the invention, the upper window 24 may be replaced without having to replace the entire cartridge 22 as required by bar code scanner housing assemblies used in the past. The upper window 24 may be easily removed and a new upper window mounted within the cartridge 22. FIG. 2A shows the housing assembly 10' which includes the cartridge 22 having the upper window 24 disposed therein and the upper enclosure 13 and the lower enclosure 12. The housing assembly 10' further includes the lower window 18 superposed over the gasket 20 which is disposed in groove 14, none of which are completely shown in FIG. 2A. The mask 16 for minimizing the ambient light reaching the interior of the housing assembly 10' is at least partially shown in FIG. 2A. The indentation 34 and the ridge 32 necessary for mounting the upper window 24 in the cartridge 22 are illustrated in FIG. 2A.

Figure 2B:
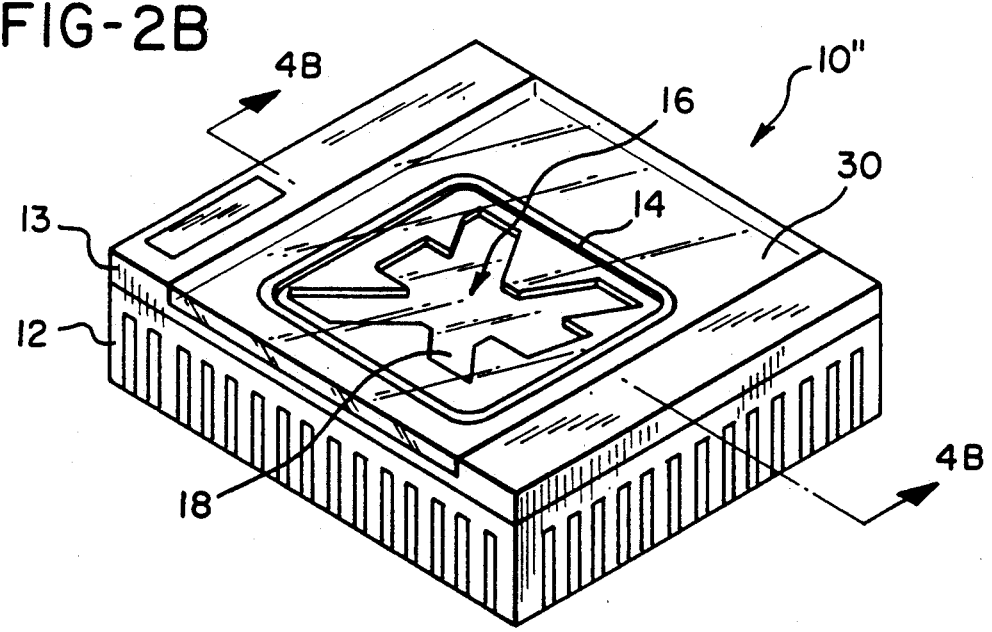

Referring now to FIGS. 1 and 2B, another embodiment of the present invention is illustrated and generally referred to herein as housing assembly 10". The housing assembly 10" comprises the lower enclosure 12 containing the means for generating bar code scan lines 11, the upper enclosure 13 having the mask 16 molded in the recess 28, the lower window 18, the groove 14, and a window cartridge 30. The window cartridge 30 is an effective substitute for the cartridge 22 such that it permits the transmission of a scanning beam and provides a substantially flush or smooth upper surface for the housing assembly 10". The incorporation of window cartridge 30 eliminates the ridge 32 and the indentation 34 associated with the cartridge 22. As stated previously, the upper window 24 must be mounted within the cartridge 22 at a slightly lower elevation and therefore, the ridge 32 is formed on the surface of the cartridge 22. Furthermore, to facilitate the throughput of products and packages across the upper window 24, the indentation 32 is formed so as to provide a smooth degradation onto the surface of the upper window 24. The checkout clerk often must twist, turn or lift each product in order to align it with the indentation 34 so that the product may then be dragged across the surface of the upper window 24 through which a scanning beam is transmitted to permit reading of the bar code label. The twisting, turning and/or lifting of the products results in abrasion on the upper window 24, thus shortening the life of such a window. More importantly, the repetitious twisting, turning, and lifting motion required by the checkout clerk may cause "carpal tunnel" syndrome.

However, the housing assembly 10" eliminates such problems by having a surface that is completely smooth. FIG. 2B clearly illustrates the housing assembly 10" which includes the window cartridge 30 being removably mounted within the lower enclosure 13. As can be seen through window cartridge 30, the mask 16 is shown to be molded in the recess 28 of the upper enclosure 13. The entire window cartridge 30 may be conveniently and expeditiously replaced in one step since the window cartridge 30 is a single piece. The means for securing the window cartridge 30 do not form part of the invention and is not illustrated nor described in detail. However, those skilled in the art should appreciate that any means including but not limited to clips and snap fasteners may be used to mount the window cartridge 30 within the recess 28 of the upper enclosure 13. The window cartridge 30 may be formed from the same materials used to make the upper window 24 and the lower window 18. As described with regard to the upper window 24, a protective coating may be deposited over the surface of the window cartridge 30 so as to withstand the abrasion to which it is subjected.

Commonly, bar code scanners are placed in environments such as supermarkets which are heavily lighted. Thus, it is relatively easy for ambient light to pass into the bar code scanner through the upper window 24 or the window cartridge 30 and reach downward into the lower enclosure 12. Such ambient light inhibits the operation of the scanner optics and transducer which detect the light returning from the bar code label being scanned. For example, the ambient light reduces the signal-to-noise ratio, thus inhibiting optimal operation of the bar code scanner. In the past, bar code scanner housing assemblies have included a mask on the upper window 24 to reduce the amount of ambient light making its way into the housing assembly 10. Such a mask is typically formed on the upper window 24 by a silk screening process which is relatively expensive. Moreover, whenever the upper window 24 must be replaced due to wear attributed to products being dragged across the upper window for scanning, the mask is unnecessarily replaced since it is permanently formed on the upper window 24.

Referring now to FIGS. 3A–3C, cross sections of the gasket 20 (referred to generally as gasket 20 and more specifically as gaskets 40, 42 and 44) are shown. As stated previously, in order for the bar code scanner to operate in an optimal fashion, both the upper window 24 and the lower window 18 must be optically transparent and free of scratches and contaminants which would impede bar code scan line transmission. In environments such as supermarkets, liquids and solids are often spilled inadvertently onto the housing assembly 10'. Eventually, the contaminants may seep into the space between the upper window 24 and the lower window 18. Similarly with regard to the housing assembly 10", the contaminants may seep into the space between the window cartridge 30 and the lower window 18. When this occurs, the lower window 18 must be cleaned which is frequently difficult and time consuming. This substantially increases the maintenance costs of the bar code scanner. Unlike other bar code scanner housing assemblies, the present housing assemblies 10' and 10" provide effective sealing of this space by forming a groove 14 around the lower window 18 and disposing a gasket 20 in the groove 14. The groove 14, in combination with the gasket 20, forms a tight seal of the space between the upper window 24 and the lower window 18 in the housing assembly 10'. Similarly, the groove 14, in combination with the gasket 20, effectively seals the space between the window cartridge 30 and the lower window 18 in the housing assembly 10".

FIG. 3A illustrates one of the several embodiments of the gasket 20 which may be used with housing assemblies 10' and 10" of the invention. The cross section of a gasket 40, as shown in FIG. 3A, may be described as having a leg portion 46 for extending into the groove 14. The leg portion 46 is connected to a rectangular base 48 which overlays the groove 14. The cross section of the gasket 40 further includes at least two arcuate channels 50 and 52 positioned at the upper surface of the rectangular base 48. The gasket 40 is disposed in the groove 14 so as to seal effectively the space formed between the upper window 24 and the lower window 18 of the housing assembly 10' and the space between the window cartridge 30 and the lower window 18 of the housing assembly 10".

FIG. 3B illustrates a cross section of a gasket 42 which may be used as the gasket 20 in accordance with the invention. The cross section of the gasket 42 may be described as having a V-shaped member 54 extending downwardly to a rectangular base 56. The space formed between the "V" of the V-shaped member of the gasket 42 and the upper window 24 may be evacuated so as to form a tighter seal between the upper window 24 or the window cartridge 30 and the lower window 18. The pressure within the "V" may be anywhere from atmospheric pressure down to a complete vacuum. It should be understood that the gasket 42 may be used in the housing assembly 10" as well as in the housing assembly 10'. FIG. 3C illustrates a cross section of yet another possible configuration of the gasket 20. A gasket 44 may be used with either the housing assembly 10' or the housing assembly 10". The gasket 44 has a cross section which includes a substantially rectangular base 58 and at least one arcuate channel 60 positioned at the upper surface 62 thereof having an annular member 64 disposed in the arcuate channel 60.

It will be appreciated by those skilled in the art that other shapes and configurations beyond those described herein and illustrated in FIGS. 3A-3C may be used in accordance with the invention. The gasket 20 comprising any of the cross sectional shapes shown in FIGS. 3A-3C may be formed from any of those materials known in the art. Preferably, the gasket 20 has a polycarbonate substrate and a sealant composition deposited thereon. The gasket 20 may be formed by initially purchasing the polycarbonate substrate in the desired shape. For example, any one of the gaskets 40, 42 or 44 may be purchased commercially. A low durometer sealant composition is mechanically applied to the polycarbonate substrate. The preferable sealant composition is purchased from the Loctite Company under the trademark Nuvasil ®. Additionally, an automation means such as a robot is preferably used to apply the sealant composition. The sealant composition is cured by exposing the gasket 20 to UV (ultraviolet light) for approximately 1 to 2 minutes. The gasket 20 should have a hardness of approximately 20 durometers shore A. The gasket 20 may then be disposed in the groove 14 as described previously.

Referring now to FIG. 4A, a schematic view of the upper enclosure 13 as shown in FIG. 2A is taken along line 4A—4A in FIG. 2A. For purposes of clarity, only the upper enclosure 13 of the housing assembly 10' is shown. The upper enclosure 13 having the recess 28 including the mask 16 molded therein. The lower window 18 is disposed over the mask 16 and within the groove 14. As stated above, it should be appreciated that mask 16 may have a multitude of shapes and configurations according to the invention and thus, the schematic view of the mask 16 as shown in FIG. 4A is only one of the several molded shapes possible for the housing assembly 10'. The cartridge 22 includes the upper window 24 removably mounted therein and is disposed over the gasket 20 within the recess 28. As partially shown in FIG. 4A, the cartridge 22 includes the indentation 34 and the ridge 32 formed as a result of having the upper window 24 mounted therein.

Referring now to FIG. 4B, a schematic view taken along line 4B—4B in FIG. 2B is shown. The upper enclosure 13 having the window cartridge 30 mounted within the recess 28 includes the gasket 20 disposed in the groove 14. The lower window 18 is disposed over the mask 16 within the groove 14. As discussed above, the means for securing the window cartridge 30 within the upper enclosure 13 are not shown for purposes of clarity. However, those skilled in the art should appreciate that any known clip, fastener, ridge or the like may be used to secure the window cartridge 30 within the upper enclosure 13.

Having described the invention in detail by way of reference to preferred embodiments thereby, it will be apparent that other modifications and variations are possible without departing from the scope of the appended claims. For example, the mask 16 may have a different size and shape from the one described herein.

What is claimed is:

1. A bar code scanner housing assembly comprising:
   a cartridge including a first window through which a scanning beam and returning light may be transmitted, said first window being removably mounted within said cartridge; and
   a housing including
   an upper surface with a recess for receiving said cartridge; said cartridge being removably mounted within said recess such that the surface of said cartridge is substantially flush with said upper surface of said housing;
   a second window mounted within said recess through which light may be transmitted; and
   means for generating a scanning beam.

2. The housing assembly of claim 1 wherein said first window is mounted within said cartridge such that the surfaces of said first window and said cartridge are substantially flush.

3. The housing assembly of claim 1 wherein said recess of said housing includes a mask molded therein so as to minimize the amount of ambient light passing into said housing through said first window and said second window.

4. The housing assembly of claim 1 wherein said cartridge has an opening therein for mounting said first window therein.

5. The housing assembly of claim 1 wherein said housing has an opening within said recess for mounting said second window therein.

6. The housing assembly of claim 1 wherein said cartridge and said housing are molded from a polymeric material.

7. The housing assembly of claim 1 wherein said first window is secured to said cartridge with a rotatable cam.

8. The housing assembly of claim 1 wherein said housing comprises an upper enclosure and a lower enclosure which contains said means for generating bar code scan lines.

9. The housing assembly of claim 1 wherein said first window and said second window are made from materials selected from the group consisting of borosilicate glass, soda-lime silicate glass, glass ceramic, quartz, near quartz, BK 7 glass and combinations thereof.

10. The housing assembly of claim 1 wherein said first window includes a first layer of material through which scan lines may be transmitted deposited onto said first window, said first layer being formed of materials selected from the group consisting of aluminum oxide, aluminum nitride, zirconium oxide, yttrium oxide, diamond film, diamond-like carbon, silicon nitride, boron nitride and combinations thereof.

11. The housing assembly of claim 10 wherein said first window includes a second layer of material through which scan lines may be transmitted deposited onto said first layer, said second layer being formed of materials selected from the group consisting of diamond-like carbon, diamond film, polytetrafluoroethylene, polyethylene, tin oxide, indium oxide, silicone polymers, boron nitride, aluminum oxide and combinations thereof.

12. A bar code scanner housing assembly comprising:
    a cartridge including a first window through which a scanning beam and returning light may be transmitted, said first window being removably mounted within said cartridge; and
    a housing including
    an upper surface having a recess for receiving said cartridge; said cartridge being removably mounted within said recess such that the surface of said cartridge is substantially flush with said upper surface of said housing;
    a second window mounted within said recess through which light may be transmitted;
    a groove surrounding said second window; said groove being a channel formed in said upper surface;
    a gasket positioned in said groove; and
    means for generating a scanning beam.

13. The housing assembly of claim 12 wherein said first window is mounted within said cartridge such that the surfaces of said first window and said cartridge are substantially flush.

14. The housing assembly of claim 12 wherein said gasket has a substantially rectangular base having at least one arcuate channel positioned at the upper surface thereof and an annular member disposed in said channel.

15. The housing assembly of claim 12 wherein said gasket has a cross section with a V-shaped member extending downwardly to a rectangular base.

16. The housing assembly of claim 12 wherein the space formed between said upper window and said V-shaped member is evacuated.

17. The housing assembly of claim 12 wherein said gasket has a cross section including a leg portion extending into said groove and connected to a rectangular base which overlays said groove, said cross section includes at least two arcuate channels positioned at the upper surface of said rectangular base.

18. The housing assembly of claim 12 wherein said gasket comprises a polycarbonate substrate having a sealant composition deposited thereon.

19. The housing assembly of claim 12 wherein said recess of said housing includes a mask molded therein so as to minimize the amount of ambient light passing into said housing through said first window and said second window.

20. A bar code scanner housing assembly comprising:
    a cartridge including a first window through which a scanning beam and returning light may be transmitted, said first window being mounted within said cartridge such that the surfaces of said first window and said cartridge are substantially flush; and
    a housing including
    an upper surface having a recess for receiving said cartridge; said cartridge being mounted within said recess such that the surface of said cartridge is substantially flush with said upper surface of said housing;
    a second window mounted within said recess through which light may be transmitted;
    a groove surrounding said second window, said groove being a channel formed in said upper surface;
    a gasket disposed into said groove comprising a polycarbonate substrate with a sealant deposited thereon;

a mask molded into the surface of said recess so as to minimize the amount of ambient light passing through said first window and said second window; and means for generating a scanning beam.

21. A bar code scanner housing assembly comprising:

a window cartridge through which scan lines may be transmitted; and a housing including an upper surface having a recess for receiving said window cartridge; said window cartridge being removably mounted with said recess such that the surface of said window cartridge is substantially flush with said upper surface of said housing;

a second window mounted within said recess through which light may be transmitted; and means for generating a scanning beam.

22. The housing assembly of claim 21 wherein said housing includes a groove surrounding said second window and a gasket disposed in said groove.

23. The housing assembly of claim 22 wherein said gasket has a substantially rectangular base having at least one arcuate channel positioned at the upper surface thereof and an annular member disposed in said channel.

24. The housing assembly of claim 22 wherein said gasket has a cross section with a V-shaped member extending downwardly to a rectangular base.

25. The housing assembly of claim 22 wherein said gasket has a cross section including a leg portion extending into said groove and connected to a rectangular base which overlays said groove, said cross section includes at least two arcuate channels positioned at the upper surface of said rectangular base.

* * * * *

UNITED STATES PATENT AND TRADEMARK OFFICE
CERTIFICATE OF CORRECTION

PATENT NO. : 5,235,168
DATED : August 10, 1993
INVENTOR(S) : Mohan L. Bobba

It is certified that error appears in the above-indentified patent and that said Letters Patent is hereby corrected as shown below:

Col. 10, Line 14, "second window; said" should be --second window, said--.

Col. 11, Line 12, "with said recess" should be --within said recess--.

Signed and Sealed this

Fifteenth Day of March, 1994

Attest:

BRUCE LEHMAN

Attesting Officer        Commissioner of Patents and Trademarks